United States Patent
Boisnault et al.

(10) Patent No.: US 11,965,426 B2
(45) Date of Patent: Apr. 23, 2024

(54) TURBINE FOR A TURBINE ENGINE COMPRISING HEAT-SHIELDING FOILS

(71) Applicant: SAFRAN AIRCRAFT ENGINES, Paris (FR)

(72) Inventors: Franck Davy Boisnault, Moissy-Cramayel (FR); Florent Pierre Antoine Luneau, Moissy-Cramayel (FR); Axel Sylvain Loïc Thomas, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/024,670

(22) PCT Filed: Aug. 26, 2021

(86) PCT No.: PCT/FR2021/051489
§ 371 (c)(1),
(2) Date: Mar. 3, 2023

(87) PCT Pub. No.: WO2022/049338
PCT Pub. Date: Mar. 10, 2022

(65) Prior Publication Data
US 2023/0250732 A1    Aug. 10, 2023

(30) Foreign Application Priority Data
Sep. 4, 2020 (FR) ........................ 2009012

(51) Int. Cl.
*F01D 9/04*    (2006.01)
*F01D 11/00*   (2006.01)
*F01D 25/08*   (2006.01)

(52) U.S. Cl.
CPC ............. *F01D 25/08* (2013.01); *F01D 9/042* (2013.01); *F01D 11/005* (2013.01); *F05D 2260/30* (2013.01)

(58) Field of Classification Search
CPC ..................... F05D 2260/241; F05D 2260/941
See application file for complete search history.

(56) References Cited

U.S. PATENT DOCUMENTS 4,856,963 A * 8/1989 Klapproth ............... F01D 9/042
 415/189
9,353,649 B2 * 5/2016 Rioux ................... F01D 25/246
(Continued)

FOREIGN PATENT DOCUMENTS

EP    2 434 107 A2    3/2012
EP    2 890 872 A2    8/2015
(Continued)

OTHER PUBLICATIONS

French Search Report for French Application No. 2009012, dated Apr. 23, 2021.
(Continued)

*Primary Examiner* — Courtney D Heinle
*Assistant Examiner* — Danielle M. Christensen
(74) *Attorney, Agent, or Firm* — BIRCH, STEWART, KOLASCH & BIRCH, LLP

(57) ABSTRACT

The turbine (12) for a turbine engine (100) extends around a major axis (X-X) and comprises: —a casing (4) comprising an annular hook (38), —a movably mounted impeller (16), —a ring (30) extending opposite the impeller in a direction radial to the major axis (XX), —a distributor (14) comprising a blade provided with a platform (11), the platform being extended radially outwards by a spoiler (22, 24), the spoiler (22, 24) being radially mounted on the hook (38), and —foils (40) each having a profiled trough shape in
(Continued)

a direction circumferential to the axis, the foils extending in succession in the circumferential direction, each foil (40) extending between the spoiler (22, 24) and the hook (38). The turbine comprises stops (162) to prevent the foils (40) from moving in the circumferential direction. Each foil (40) comprises a protrusion (162) arranged so as to extend circumferentially opposite another protrusion (162) of another adjacent foil (40).

12 Claims, 6 Drawing Sheets

(56) References Cited

U.S. PATENT DOCUMENTS

| | | | |
|---|---|---|---|
| 10,344,610 B2 * | 7/2019 | Loiseau | F01D 11/005 |
| 10,808,564 B2 * | 10/2020 | Barker | F01D 25/246 |
| 2012/0128481 A1 | 5/2012 | Baumas et al. | |
| 2013/0208249 A1 | 8/2013 | Langlois et al. | |
| 2018/0355740 A1 * | 12/2018 | Usseglio | F01D 11/003 |

FOREIGN PATENT DOCUMENTS

| | | |
|---|---|---|
| EP | 2 900 932 A1 | 8/2015 |
| EP | 2 368 016 B1 | 10/2016 |
| FR | 2 967 730 B1 | 5/2015 |
| FR | 2 986 836 B1 | 1/2016 |

OTHER PUBLICATIONS

International Search Report for International Application No. PCT/FR2021/051489, dated Nov. 4, 2021.

* cited by examiner

TURBINE FOR A TURBINE ENGINE COMPRISING HEAT-SHIELDING FOILS

FIELD OF THE INVENTION

The invention relates to turbomachines, particularly aircraft turbojet engines and turboprops.

STATE OF THE ART

Document FR-3 084 103 discloses a turbomachine forming an aircraft turbojet engine. The turbomachine is a two-spool turbomachine and includes a fan, a low-pressure compressor, a high-pressure compressor, a combustion chamber, a high-pressure turbine and a low-pressure turbine. The low-pressure turbine comprises several successive stages each comprising a downstream nozzle and an upstream impeller. Conventionally, in the present application, the terms "upstream" and "downstream" are defined relative to the direction of circulation of the gases in the turbine. Each nozzle comprises two radially inner and outer coaxial annular platforms, between which blades extend. The nozzle is attached to an outer casing of the turbine. The outer platform comprises at its upstream end two flanges which extend on either side of an annular groove open upstream which form a spoiler equipped with a clamp. The set of nozzles forms the fixed portion of the engine called "stator".

The various wheels are connected to a drive shaft so as to form the rotor of the turbine. Each wheel rotates inside a ring also attached to the outer casing. This ring is formed of ring sectors which each carry internally a block of abradable material capable of frictionally cooperating with annular wipers disposed at the periphery of the blades of the rotor. A downstream annular hook of the casing, forming a rail, and a downstream edge of the ring sectors are held in the spoiler.

Anti-wear foils are disposed between the annular hook and the nozzle. The foils each have a profiled shape along a direction circumferential to the axis and extend successively along this direction. Each foil is housed in the spoiler by being interposed between the spoiler on the one hand and the hook and the edge of the ring on the other hand. These foils have a thermal protection and anti-wear function (it concerns limiting the wear between the nozzle and the hook of the casing).

Indeed, the evolution of civil engines has resulted in the increase of their operating temperatures to improve their performance. However, the needs for accuracy on the clearances at the top of the wheels require good control of the displacements of the hooks of the casing ensuring the fixing of the nozzles. To do so, it is sought to make sure that the casing hooks (or rails) remain relatively cold and therefore make sure to isolate them as much as possible from the relatively hot nozzle spoilers and whose temperatures are close to the temperature of the aerodynamic flowpath. The foils allow limiting heat conduction between the casing hooks and the nozzle spoilers. In addition, it concerns limiting the temperature of the nozzle spoiler by protecting it from the air stream which passes between the ring sectors.

However, a problem of mutual overlapping of the foils in the circumferential direction may arise. This problem may appear during their mounting in the turbomachine, particularly if they are blindly mounted or quickly covered by another part. This problem may also arise during operation due to the vibrations or to the thermal variations within the turbomachine.

One aim of the invention is to avoid the mutual overlapping of the foils.

DISCLOSURE OF THE INVENTION

For this purpose, there is provided according to the invention a turbine for a turbomachine extending about a main axis and comprising:
  a casing comprising an annular hook,
  a movably mounted wheel,
  a ring extending facing the wheel along a radial direction of the main axis,
  a nozzle including a blade provided with a platform, the platform being extended radially outwards by a spoiler, the spoiler being radially mounted on the hook, and
  foils each having a channel-like profiled shape along a direction circumferential to the axis, the foils extending successively along the circumferential direction,
each foil extending between the spoiler and the hook,
the turbine comprising stops to prevent a displacement of the foils along the circumferential direction.

These means which avoid the mutual overlapping of the foils can take several forms.

It can be provided that each foil comprises reliefs or cavities configured to limit the displacement of the foil along a circumferential direction.

It can thus generally be provided that each foil comprises a protrusion or a recess able to form these means.

According to the invention, each foil comprises a protrusion disposed so as to extend circumferentially facing another protrusion of another circumferentially adjacent foil.

Thus, the protrusions can bear against each other to prevent the overlapping of the foils during the mounting or during the operation. Here, the foils can therefore directly bear against each other.

It can be provided that the protrusions of each foil are at least two in number, said protrusions of each foil protruding from a circumferential end of the foil.

It can also be provided that, on each foil, the protrusions are at least two in number on at least one edge adjacent to another of the foils.

In one embodiment, on each foil, at least one of the protrusions extends in the radial direction.

It can be provided that the protrusions are rounded.

In one alternative implementation, the ring includes fingers passing through the spoiler of the nozzle, each foil having at least one recess able to circumferentially bear against one of the fingers. The fingers block the ring in circumferential rotation relative to the nozzle. This time, the foils therefore do not bear against each other but bear against the ring. Advantage is taken of the anti-rotation function already associated with the fingers to prevent the overlapping of the foils.

It can be provided that the recess extends from a circumferential end of the foil.

It is thus easy to make, in particular by cutting.

Advantageously, each foil comprises two recesses, each recess extending to an opposite circumferential end of the foil.

It can be provided that the ring is formed of ring sectors disposed successively along the circumferential direction and separated in pairs by circumferential junction areas of the ring sectors, the foils also being separated in pairs circumferentially from each other by junction areas of the foil, the junction areas of the foils being offset in the circumferential direction relative to the circumferential junction areas of the ring sectors.

Thus, the gas leaks between the ring sectors are further limited by further increasing the path through which the gases must flow to cross them.

A turbomachine can also be provided according to the invention, such as an aircraft turboprop or turbojet engine, comprising at least one turbine according to the invention.

DESCRIPTION OF THE FIGURES

Two embodiments of the invention will now be presented by way of non-limiting examples in support of the drawings in which.

DETAILED DESCRIPTION

Figure 1:
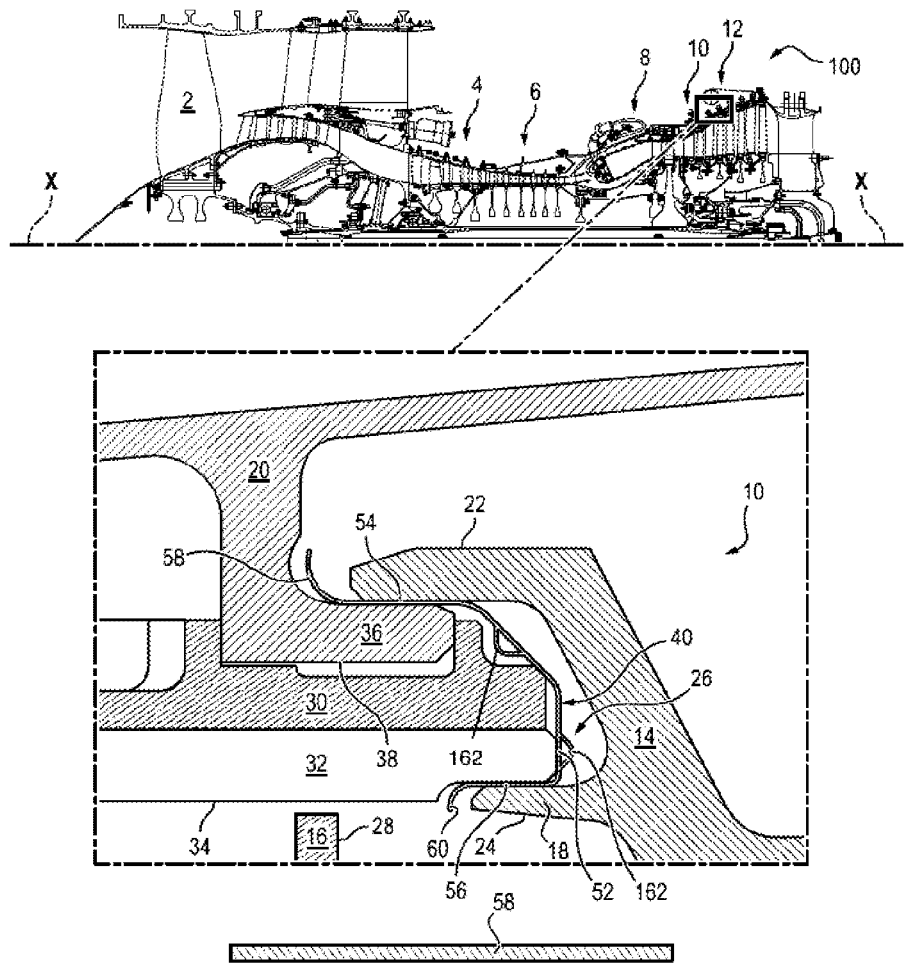
FIG. 1 is a half general view in axial section of a turbomachine in a first embodiment of the invention and an enlarged view of a detail of the half general view.
Figure 2:
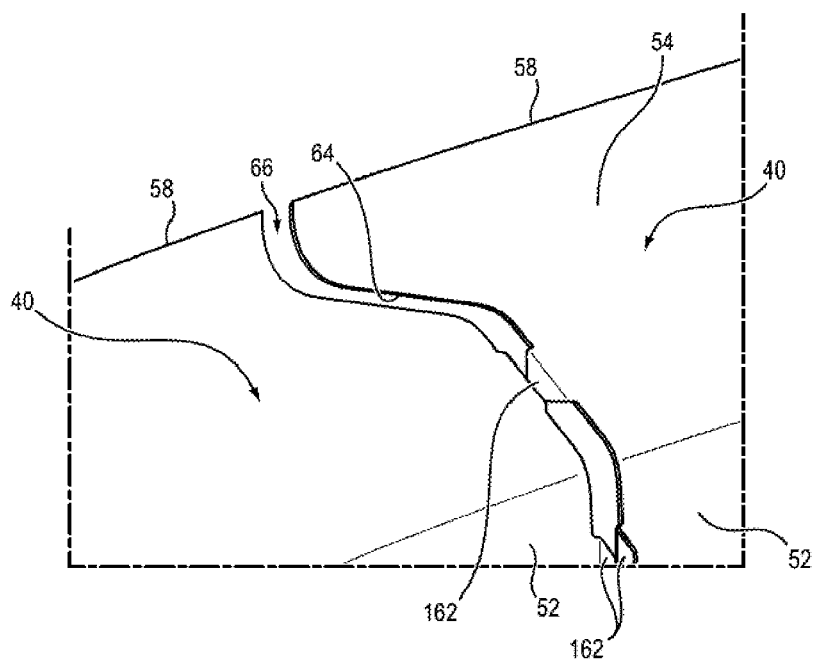
FIG. 2 is a partial perspective view of the foils of the turbomachine of FIG. 1.
Figure 3:
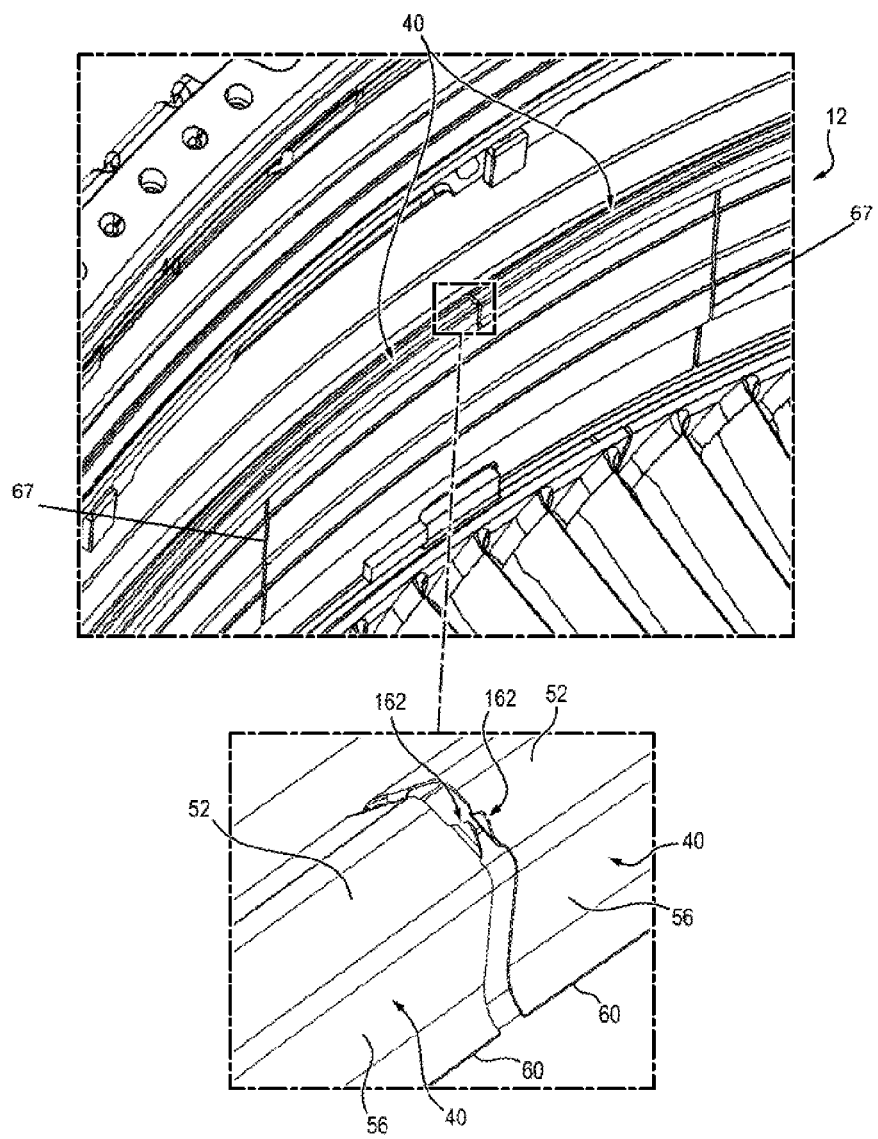
FIG. 3 is a partial perspective view of the turbomachine in this embodiment with an enlarged view of a detail.
Figure 4:
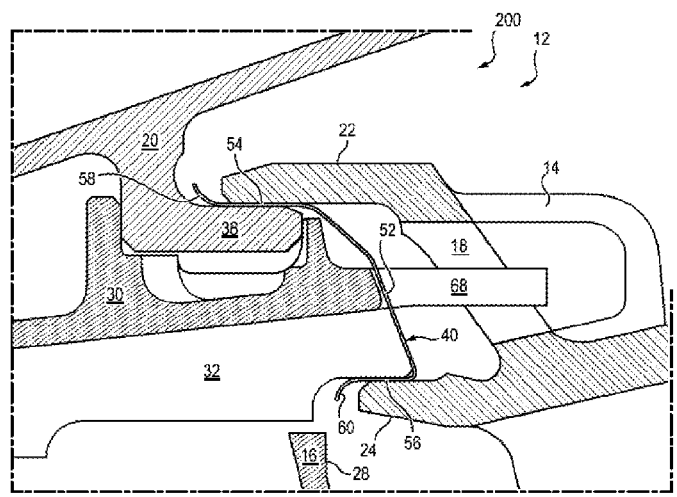
FIGS. 4, 5 and 6 are views similar to the previous ones showing a second embodiment of the invention.

A first embodiment of the invention will be presented with reference to FIGS. 1 to 3.

This is an aircraft turbojet engine 100 forming a two-spool turbomachine which includes, from upstream to downstream, a fan 2, a low-pressure compressor 4, a high-pressure compressor 6, a combustion chamber 8, a high-pressure turbine 10 and a low-pressure turbine 12. The turbomachine has a main axis X-X which serves as axis of rotation of the rotor relative to the stator.

The low-pressure turbine 12 comprises several successive stages each comprising a downstream nozzle 14 and an upstream impeller 16. The set of nozzles 14 belongs to the fixed portion of the engine forming the stator that also comprises an outer casing 20.

Each nozzle 14 comprises a radially inner annular platform 18 and a radially outer annular platform 18 coaxial with each other, between which radial or substantially radial blades with reference to the axis X-X, which are evenly spaced over the entire circumference of the platforms, extend. The nozzle 14 is attached radially outwards to the outer casing 20.

To do so, the outer annular platform 18 comprises, at its upstream end, a radially outer flange (or finger) 22 and a radially inner flange (or finger) 24 which both extend upstream. These two flanges define therebetween an annular groove 26 open upstream. They form a spoiler equipped with a clamp thus presenting two claws or jaws.

Each impeller 16 comprises a disk carrying radial or substantially radial blades 28 at its outer periphery, the disks of the various wheels being coaxially connected to each other and to a drive shaft by suitable means, so as to form the rotor of the turbine.

The impeller 16 rotates inside a ring 30. This ring is formed of several ring sectors 32, which extend in a circle along the direction circumferential to the axis, and which are arranged end to end in the same direction. They each carry internally a block of abradable material 34. These blocks are capable of frictionally cooperating with annular wipers disposed at the radially outer periphery of each blade 28 of the rotor.

The ring sectors are attached to the outer casing 20. To do so, each ring sector 32 comprises at its downstream end an annular groove sector open radially outwards.

The groove sectors together form an annular groove 36 in which is engaged a downstream hook 38 of the outer casing, thus ensuring the fixing of the ring 30 on the casing. The hook has the profiled shape of an annular rail.

The hook 38 and the downstream ends of the ring sectors 32 are held along a radial direction (that is to say from bottom to top and from top to bottom in FIG. 1) by the inner 24 and outer 26 flanges of the outer platform 18. This clamp presses the hook 38 and the ring 30 along the radial direction and holds them in the groove 26 of the spoiler. It mounts the ring against the casing hook.

The turbomachine also comprises anti-wear foils 40. The foils 40 each have a channel-like shape, profiled along the direction circumferential to the axis X-X. They extend successively along this direction. In this way, just like the ring sectors 32, they form an assembly with a symmetry of revolution about the axis.

The foils are here identical to each other. As can be seen in FIG. 1, each foil 40 has the shape of a channel and comprises a planar bottom 52 perpendicular to the axis X-X, a radially outer cylindrical wall 54 and a radially inner cylindrical wall 56. It is disposed in the groove 26 so that its outer wall 54 is in contact with the radially internal face of the outer finger 22 and that its inner wall 56 is in contact with the radially external face of the inner finger 24. Each foil thus has, in radial section, as illustrated in FIG. 1, a general shape of an asymmetrical "U", just like that of the groove 26 of the spoiler. Each foil 40 extends in the spoiler 22, 24 by being interposed between the latter on the one hand and the hook 38 and the edge of the ring 30 on the other hand. Each foil extends radially over the entire clamp of the spoiler, namely both on the outer finger 22 of the clamp and on its inner finger 24.

The foil 40 has a radially outer end 58 curved outwardly of the turbine, so that it extends in front of the upstream face of the radially outer finger 22. It also has a radially inner end 60 curved inwardly of the turbine and which extends facing the upstream face of the radially inner finger 24. These ends 58, 60 ensure the axial blocking of the foil. Thus, the two free ends of the section of the foil form two respective lips which come out of the groove and which are curved in directions opposite to each other, one in the direction of the axis and the other in the direction opposite to the axis.

As seen in FIGS. 2 and 3, the turbine comprises stops 162 to prevent a displacement of the foils 40 along the circumferential direction relative to each other.

In this embodiment, there are protrusions or lugs 162 on each foil 40 that form the stops and are disposed so that the protrusions of two circumferentially adjacent foils extend facing each other. The protrusions 162 protrude from each longitudinal end edge 64 of the foil facing the circumferentially adjacent foil 40. The protrusions here have a half-disk shape but other shapes such as a rectangular or square shape would also be possible. The protrusions 162 are here folded to extend in a plane inclined relative to the local plane of the foil and relative to the circumferential direction. Each protrusion 162 therefore protrudes from one face of the foil.

In the present example, on each foil 40, the protrusions 162 are two in number on each edge 64 adjacent to another of the foils. In addition, in this case, on each edge, one of the protrusions 162 is oriented towards the axis and upstream, so that it is radial, and the other is oriented downstream. The first ones extend from a wall of the foil located between the bottom 52 and the outer wall 54. The second ones extend from the bottom 52.

Each foil 40 is symmetrical relative to a radial plane passing through the center of the foil. In this way, the protrusion 162 of the foil oriented towards the axis is directly facing a protrusion of the adjacent foil having the same orientation. It can therefore abut against it to prevent the mutual overlapping of the two adjacent foils, during the mounting or in operation. The same applies analogously to the protrusion oriented in the downstream direction.

During the mounting, the stops 162 form means for circumferentially positioning the foils relative to each other. In operation, they prevent the rotation of each foil 40 about the axis of the turbine relative to the other foils.

It was seen that the ring 30 was formed of sectors 32 disposed successively along the circumferential direction. They are separated from each other by junction areas 67 of the sectors. The foils 40 are similarly separated from each other by junction areas 66 of the foils. These junction areas are offset in the circumferential direction relative to the junction areas 67 of the sectors. In other words, the junctions of the two groups are not coincident. In this way, the pressure drops are increased during the passage of the gases between the ring sectors 32 then between the foils 40 for better insulation.

In the present example, each foil 40 is made of thin sheet metal, for example less than 1 mm thick, which gives it a certain elasticity. It can be manufactured from an alloy that is particularly resistant to wear and to thermal stresses, such as a cobalt-based and/or nickel-based alloy.

Thanks to the foils, the hooks or rails 38 of the casing remain relatively cold and are isolated as much as possible from the spoilers of the nozzles whose temperatures are close to the temperature of the aerodynamic flowpath. The foils 40 allow limiting the heat conduction between these parts. In addition, they limit the temperature of the spoiler of the nozzle by protecting it from the air stream which passes between the ring sectors. The bottom 52 of the foil 40 indeed constitutes a sealing barrier for the gas which cannot flow between the downstream end of the sealing ring and the throat 26 of the nozzle.

This embodiment is in particular suitable in the configurations where the ring 30 has no anti-rotation means cooperating directly with the opposite nozzle.

A second embodiment of the invention will now be presented with reference to FIGS. 4 to 7. The characteristics of the turbomachine 200 which are not described again are identical to those of the first embodiment.

This time, the ring 30 includes fingers 68 penetrating into housings of the nozzle 14 along the axial direction, downstream, and bearing if necessary against the nozzle along the circumferential direction. The fingers 68 are distributed over the ring along the circumferential direction. They have for example a profiled shape, flattened along the radial direction and a rectangular-shaped section in a plane perpendicular to the axis. But other shapes can be envisaged.

Each foil 40 has two recesses 262 each able to bear against one of the fingers 68 along the circumferential direction. In this example, each recess 262 extends from a respective longitudinal end edge 64 of the foil located facing a similar edge 64 of the adjacent foil. The number of recesses 262 is two on each foil, the recesses extending in opposite edges of the foil. The recesses here are provided in the bottom 52 of the foil. Again, each foil is symmetrical relative to a plane radial to the axis passing through its center.

Figure 5:
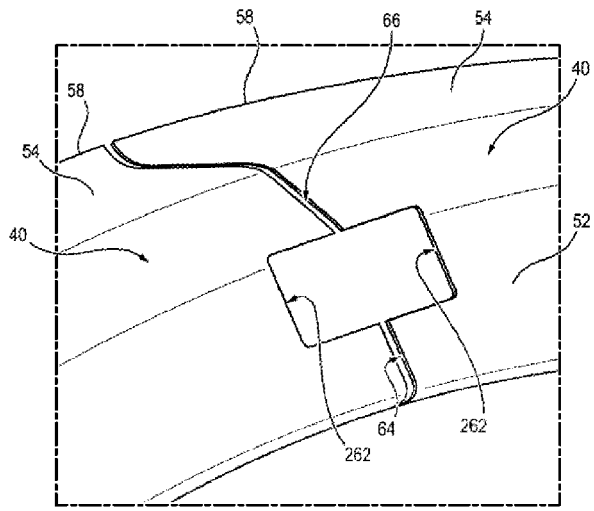
Figure 6:
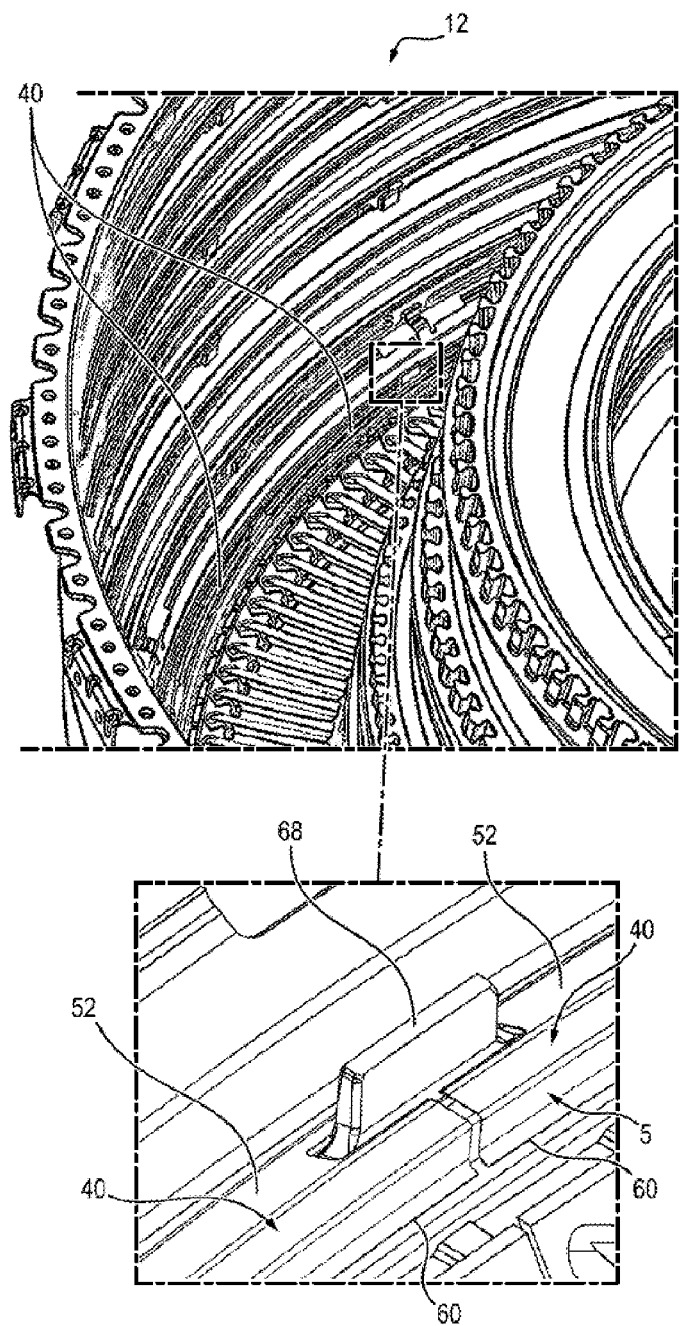
Figure 7:
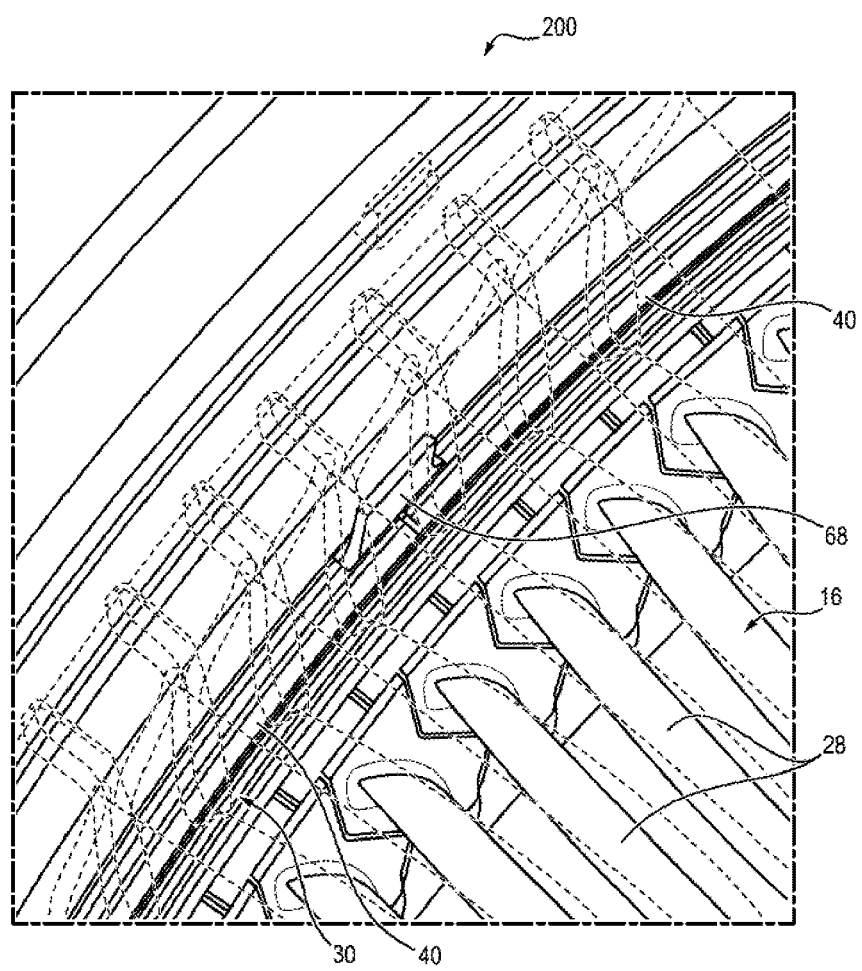
FIG. 7 is a partial perspective view illustrating the turbomachine of this second embodiment during a step of its mounting.

As seen in FIG. 5, the two recesses or notches 262 of the circumferentially adjacent foils together form a rectangular housing allowing the passage of the respective finger 68 of the ring, as illustrated in FIG. 6. The finger and the recesses ensure the good positioning of the foils during their mounting in the turbomachine. During operation, the fingers prevent the overlapping in the circumferential direction of the foils by forming a stop therefor along the circumferential direction.

In both embodiments, the mounting can take place as follows. It is assumed that the nozzle 14 is also divided into sectors which follow one another in the circumferential direction and whose number is equal to the number of foils 40. It is provided that the foils are associated with the respective nozzle sectors. It is therefore possible to mount each foil in contact with the corresponding nozzle sector, then separately install each sub-assembly thus constituted in the turbomachine. The foils then ensure good mutual positioning of the nozzle sectors in the circumferential direction. The invention allows not to have an overlapping in the circumferential direction nor a damage if these sub-assemblies are blindly assembled in the turbomachine, that is to say in a configuration where the nozzle hides from the view of the operator the ring 30 already installed and the foil 40 which is not visible during its installation. This is the case, for the second embodiment, in the configuration of FIG. 7 on which the nozzle 14 is represented in transparency in order to show the foils 40 and the ring 30.

The anti-rotation function of the foils 40 is also useful in operation in order to avoid any overlapping in the circumferential direction under the effect of the slight tangential displacements of the nozzles.

Of course, many modifications may be made to the invention without departing from its scope.

The turbomachine can comprise other thermal insulation and sealing means, in addition to the foils.

The stops preventing the overlapping of the foils in the circumferential direction can take other forms than those presented in the embodiments above. It is possible to vary their number and disposition on each foil.

The two embodiments which have been described in detail above can be combined.

The invention claimed is:
1. A turbine for a turbomachine,
the turbine having a main axis and comprising:
  a casing comprising an annular hook,
  a movably mounted wheel,
  a ring extending facing the wheel along a radial direction of the main axis,
  a nozzle including a blade provided with a platform,
    the platform being extended radially outwards by a spoiler,
    the spoiler being radially mounted on the hook of the casing,
  foils each having a channel-like profiled shape along a direction circumferential to the main axis,
    the foils extending successively along the circumferential direction,
    each foil extending between the spoiler and the hook, and
  stops to prevent a displacement of the foils along the circumferential direction,
wherein each foil comprises a protrusion extending circumferentially facing another protrusion of another circumferentially adjacent foil.

2. The turbine according to claim 1, wherein each foil comprises reliefs or cavities configured to limit the displacement of the foil along a circumferential direction.

3. The turbine according to claim 1, wherein the protrusions of each foil are at least two in number, the protrusions of each foil protruding from a circumferential end of the foil.

4. The turbine according to claim 1, wherein, on each foil, at least one of the protrusions extends in the radial direction.

5. The turbine according to claim 1, wherein the protrusions are rounded.

6. The turbine according to claim 1, wherein the ring includes fingers passing through the spoiler of the nozzle, each foil having at least one recess configured to circumferentially bear against one of the fingers.

7. The turbine according to claim 6 wherein the recess extends from a circumferential end of the foil.

8. The turbine according to claim 6 wherein each foil comprises two recesses, each recess extending to an opposite circumferential end of the foil.

9. The turbine according to claim 1,
wherein the ring is formed of ring sectors disposed successively along the circumferential direction and separated in pairs by circumferential junction areas of the ring sectors,
the foils being separated in pairs circumferentially from each other by junction areas of the foils,
the junction areas of the foils being offset in the circumferential direction relative to the circumferential junction areas of the ring sectors.

10. A turbomachine comprising at least one turbine according to claim 1.

11. An aircraft turboprop forming the turbomachine according to claim 10.

12. A turbojet engine forming the turbomachine according to claim 10.

* * * * *